United States Patent [19]
Westenrieder et al.

[11] 3,795,385
[45] Mar. 5, 1974

[54] BALL VALVE

[75] Inventors: Georg K. Westenrieder, South Holland; James C. Ruffolo, Country Club Hills, both of Ill.

[73] Assignee: Union Tank Car Company, Chicago, Ill.

[22] Filed: Nov. 10, 1972

[21] Appl. No.: 305,385

[52] U.S. Cl.................. 251/170, 251/159, 251/315
[51] Int. Cl............................................. F16k 25/00
[58] Field of Search... 251/159, 160, 161, 162, 163, 251/170, 172, 315

[56] References Cited
UNITED STATES PATENTS

| | | | |
|---|---|---|---|
| 3,179,121 | 4/1965 | Bredtschneider | 251/170 X |
| 3,132,836 | 5/1964 | Dickerson | 251/315 X |
| 3,061,265 | 10/1962 | Schiegries | 251/159 X |
| 3,007,490 | 11/1961 | Passmore | 251/159 X |
| 1,998,080 | 4/1935 | Gerlich | 251/159 X |
| 3,588,042 | 6/1971 | Yopp | 251/315 |
| 2,788,017 | 4/1957 | Scherer | 251/170 X |
| 1,738,450 | 12/1929 | Ryan | 251/159 |
| 1,941,839 | 1/1934 | Johansson | 251/70 |

*Primary Examiner*—Harold W. Weakley
*Attorney, Agent, or Firm*—Joel E. Siegel; Charles M. Kaplan

[57] ABSTRACT

A ball valve including a body having two longitudinally aligned fluid passages and a lateral opening communicating with a central space. A rotatable ball, having an opening communicable with the fluid passages, is positioned within the central space. A pair of annular seat rings of wedge shape cross section, fit against and clampingly secure the ball therebetween. A pair of seat ring retainer means, integral with the body, having side walls inclined downwardly and inwardly, wedge the ball and seat rings therebetween. Bonnet means is secured to the body in covering relationship to the seat rings and ball. Piston means extend through the bonnet means for selectively applying pressure to an upper portion of the seat rings to compress the seat rings to the ball and the retainer means side walls. Various means are disclosed for the actuation of the piston means. A rotatable valve stem passes through the lateral opening and the bonnet means, and is connected to the ball to rotate the ball between positions of permitting and preventing the passage of fluid therethrough.

5 Claims, 5 Drawing Figures

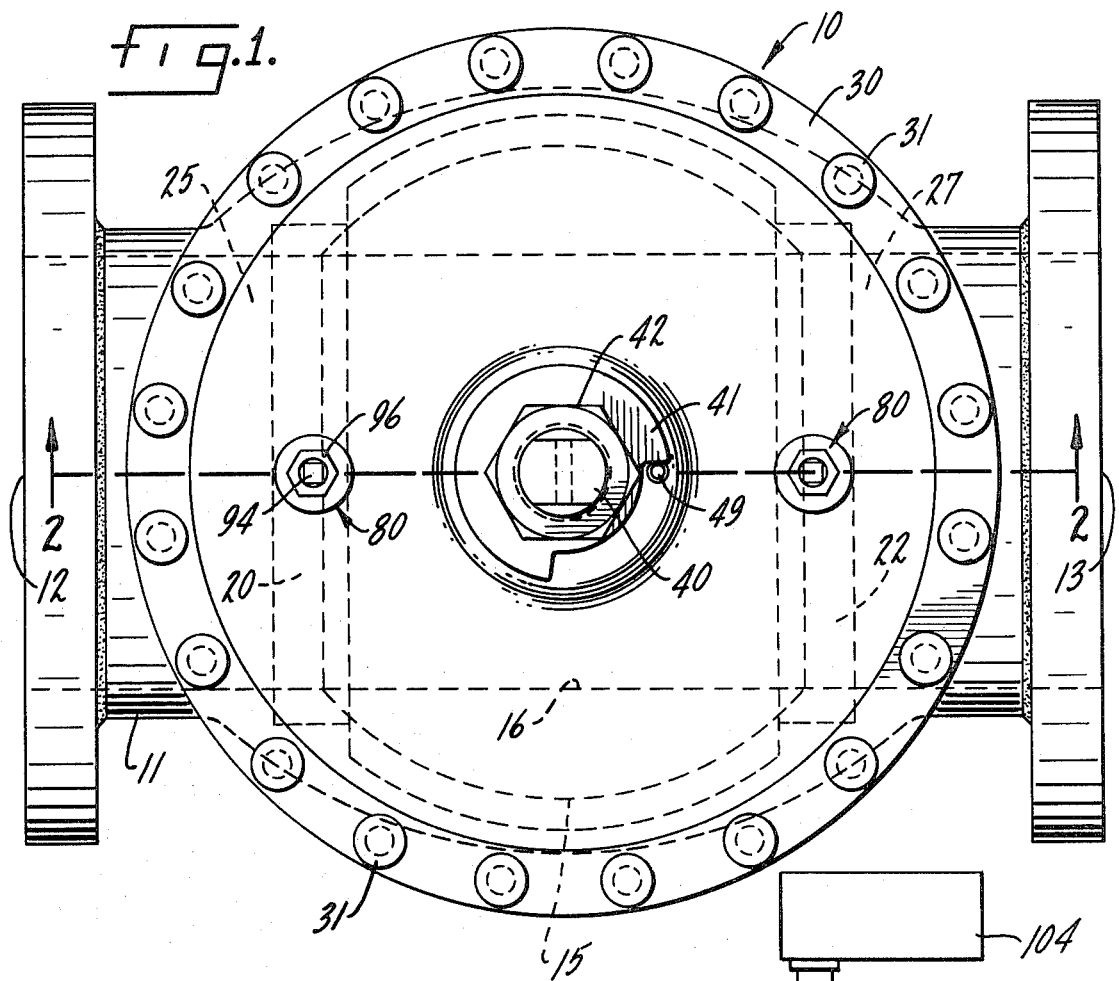
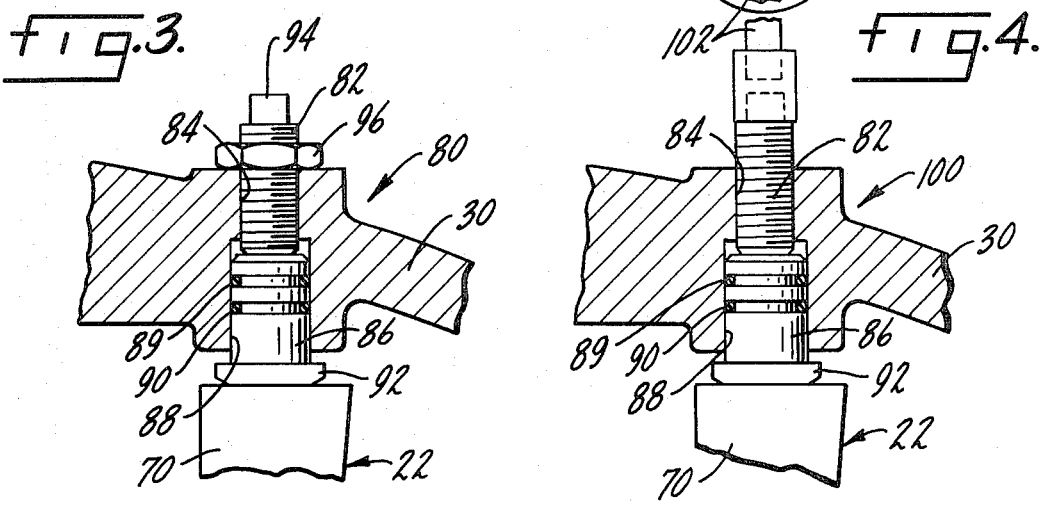

BALL VALVE

BACKGROUND AND SUMMARY OF THE INVENTION

This invention relates to ball valves, and more particularly to an improved ball valve having unique seat ring adjustment means associated therewith for compressing the seat rings between the ball and seat ring retainers.

The present invention is an improvement of the "Top Entry Ball Valve" disclosed in U. S. Pat. No. 3,588,042, assigned to the same assignee as the present invention. The disclosure of this patent is hereby incorporated by way of reference since certain objects, features and advantages of the present invention are common to certain objects, features and advantages of said patent.

The ball valve of the type disclosed in U. S. Pat. No. 3,588,042, utilizes a pair of seat rings, of wedge shape cross section, to fit against and clampingly secure the ball therebetween. A pair of seat ring retainer means, having side walls inclined downwardly and inwardly, wedge the ball and seat rings therebetween. The present invention provides a positive valve seat ring adjustment means, actuated from outside the valve, for selectively applying pressure to the valve seat rings forcing them into tighter contact with the ball and seat retainer means. The valve of the present invention is thereby able to compensate for excessive valve seat ring deformation due to accidental over pressure or over temperature application or for normal seat ring wear. In case of fire and subsequent seat destruction the valve may be remotely actuated, either manually or automatically, to force the seat rings into tighter engagement with the ball and seat ring retainer means.

Other attempts to provide ball valves with adjustable seats have used Belleville Springs, wave washers, or helical compression springs. The springs in these other attempts have been loose pieces and were thus vulnerable to loss or misapplication. These attempts provided what could be termed as resilient positioning with relatively limited travel or takeup. Still other attempts have utilized system or line pressure to supplement spring loaded seats. This method does not provide positive seat positioning and is dependent upon the existence of a substantial system pressure.

It is a primary object of the present invention to provide an improved ball valve assembly having adjustment means associated with the valve seat rings for maintaining proper ball to valve seat contact pressure.

Another object is to provide a ball valve assembly having adjustment means associated with the valve seat rings to compensate for excessive valve seat ring deformation due to an accidental over pressure or over temperature application or for normal valve seat wear.

A further object is to provide a ball valve assembly having fire safe sealing between the valve seat rings and ball that is not entirely dependent on gravity or line pressure to effect the seal.

A still further object of the present invention is to provide a ball valve assembly having a positive valve seat ring adjustment which is remotely actuated.

Another object is to provide a top entry ball valve that is inexpensive to manufacture without sacrificing quality or reliability in operation.

To attain these and other objectives, the present invention provides a body having two longitudinally aligned fluid passages and a lateral opening communicating with a central space. A rotatable ball, having an opening communicable with the fluid passages, is positioned within the central space. A pair of annular seat rings of wedge shape cross section, fit against and clampingly secure the ball therebetween. A pair of seat ring retainer means, integral with the body, having side walls inclined downwardly and inwardly, wedge the ball and seat rings therebetween. Bonnet means is secured to the body in covering relationship to the seat rings and ball. Piston means extend through the bonnet means for selectively applying pressure to an upper portion of the seat rings to compress the seat rings to the ball and the retainer means side walls. The present invention contemplates the actuation of the piston means by one of three embodiments: a manual rotation embodiment; a remotely located electric, hydraulic or pneumatic motor embodiment; or by a remotely controlled hydraulic or pneumatic pressure embodiment. A rotatable valve stem passes through the lateral opening and the bonnet means, and is connected to the ball to rotate the ball between positions of permitting and preventing the passage of fluid therethrough.

BRIEF DESCRIPTION OF THE DRAWINGS

With these and other objects in view, as will hereinafter more fully appear, and which will be more particularly pointed out in the appended claims, reference is now made to the following description taken in connection with accompanying drawings, in which:

FIG. 1 is a top plan view of the valve assembly of the present invention;

FIG. 3 is an enlarged elevational view of the valve seat ring adjusting means shown in FIG. 1;

FIG. 4 is an elevational view of a portion of a valve assembly of the type shown in FIG. 1 incorporating a first alternative embodiment of the valve seat ring adjusting means of the present invention.

DESCRIPTION OF PREFERRED EMBODIMENTS

Figure 2:
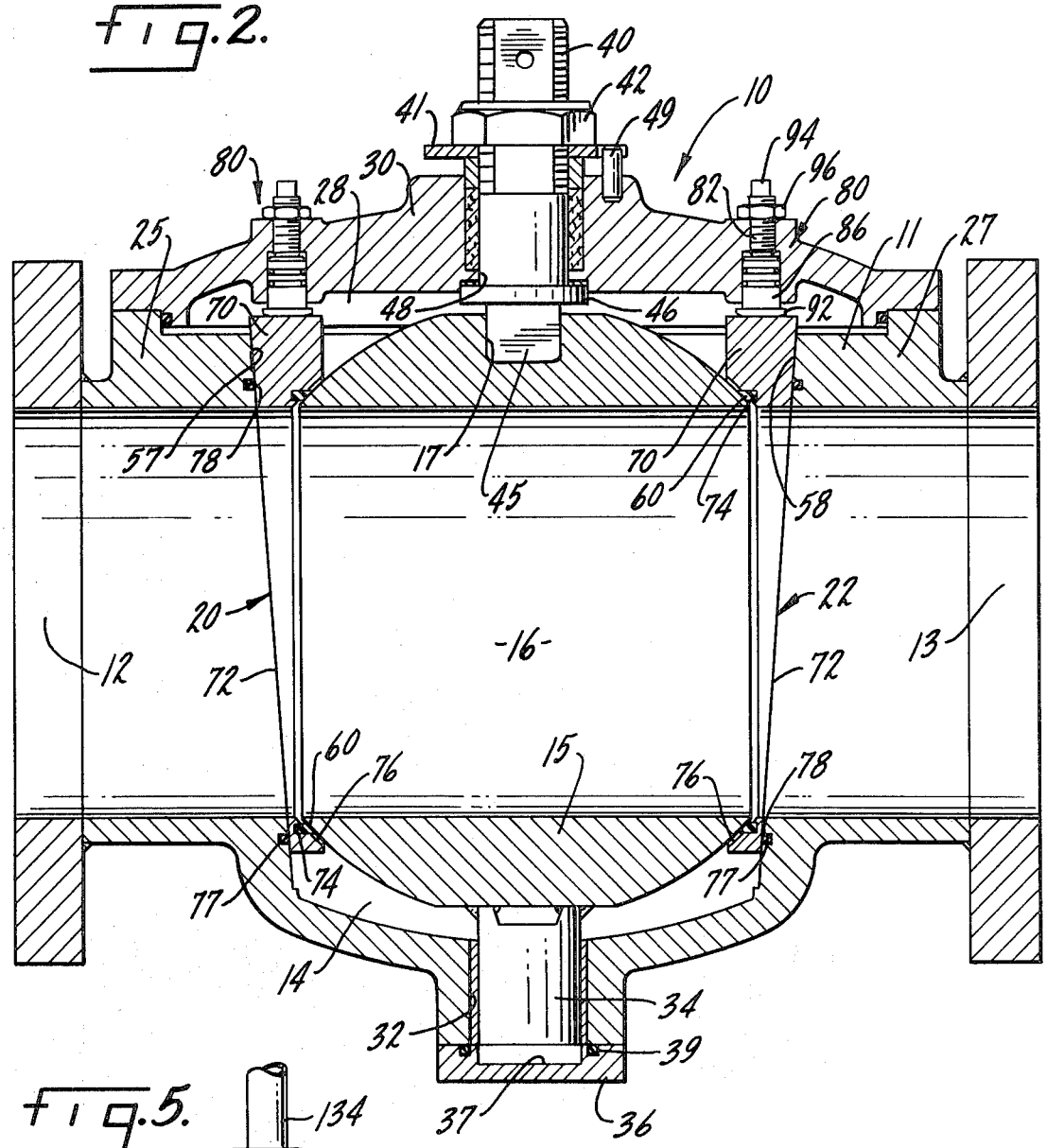
FIG. 2 is a sectional view taken along line 2—2 in FIG. 1 of the valve assembly showing the valve seat ring adjusting means of the present invention.

Referring to FIGS. 1 and 2, the ball valve 10 of the present invention includes a tubular body 11 formed with an inlet passage 12 and an outlet passage 13 extending in axial alignment, one with the other. Body 11 is preferably pressure formed from one piece of tubular material to the shape as illustrated. Interposed between these passages is a central space 14 containing ball valve member 15. A flow passage 16 is formed in ball 15 to establish fluid flow between inlet passage 12 and outlet passage 13, when the valve is in an open position, as in FIG. 2. The remaining surface of ball 15 serves as a barrier wall of spherical form which prevents fluid flow between psssages 12 and 13 when the valve is in its closed position.

Ball 15 is mounted between two wedge shape seat rings 20 and 22, both of which are in turn supported by a pair of seat ring retainer means 25 and 27. As seen in FIG. 1, seat ring retainer means 25 and 27 are formed integral with body 11 and are in fluid communication with passages 12 and 13 respectively. Retainer means 25 and 27 have side walls 57 and 58 respectively, inclined downwardly and inwardly approximately 5° from the vertical. Ball 15 and seat rings 20 and 22 are wedged between retaining means 25 and 27.

Body 11 has a lateral opening 28, through what may be considered the top of the body, through which ball valve member 15 and its associated seat rings 20 and 22 may be removed. Closing off opening 28 is a bonnet 30 which may be removably secured to valve body 11 in any conventional manner, i.e., by a series of cap screws 31. A stem 40, to which is suitably secured a stop plate 41 by way of a lock nut 42, has at its lower end a downwardly projecting lug 45 adapted to engage a shallow slot 17 in the top of ball 15. This stem and the interconnecting lug and slot constitute means for rotating ball 15 about a vertical axis. Stem 40 has an annular flange 46 at its lower end which is shaped to define the lug 45. The upper portion of stem 40 passes through a suitable cylindrical opening 48 in bonnet 30 having a diameter less than the diameter of flange 46. Bonnet 30 may be provided with an upwardly extending follower 49 which is received by a quarter circle notch in the outer surface of stop plate 41, so as to limit rotation of stem 40 to 90°.

To facilitate alignment of ball 15 in body 11 a cylindrical channel portion 32 may be formed integral with body 11 in vertical alignment with opening 48 for receipt of a stem 34 secured to ball 15 in a suitable manner, as by welding. A cap 36, having a cavity 37 formed therein, is secured to the bottom end of channel 32 in a suitable manner, as by cap screws (not shown), in closing relationship thereto. O-ring 39 is provided to seal the connection between channel portion 32 and cap 36. The diameter of stem 34 is slightly less than the diameter of cavity 37 so as to permit the entry of stem 34 thereinto upon vertical positioning of ball 15.

Seat rings 20 and 22 preferably include an inner sealing ring 60 confined within an outer ring 70, as best seen in FIG. 2. Outer ring 70, formed from a metalic material, has an inclined outer surface 72 positioned to contact surface 57 or 58 of retainer means 25 or 27. Inner ring 60, formed from a yieldable material, is received within an annular recess 74 in inner surface 76 of rings 70. Inner rings 60 are positioned to contact ball 15 in a sealing relationship thereto. O-rings 77 are received within a recess 78 formed in side walls 57 and 58 to cause a seal between outer rings 70 and ring retainer means 25 and 27.

Referring to FIGS. 2 and 3, the seat ring adjustment means of the present invention is indicated generally at 80. Adjustment means 80 includes a threaded shaft 82 which is threadedly received within an opening 84 in bonnet 30. Opening 84 is in vertical alignment with a seat ring 20 or 22. Secured to the lower end of shaft 82, in axial alignment therewith, is a piston 86 which is received within chamber 88 in axial alignment with opening 84. Piston 86 includes O-rings 89 and 90 embedded therein to effect a fluid tight seal between piston 86 and chamber 88. The lower end of piston 86 includes a base portion 92 secured thereto to selectively apply pressure to the upper surface of the seat ring 20 or 22 associated therewith. The upper end of shaft 82 has a wrench receiving fitting 94 associated therewith for receiving a wrench type tool to facilitate the rotation of shaft 82. A locking nut 96 is provided to lock shaft 82 in position relative to bonnet 30.

In operation of seat ring adjustment means 80 the shaft 82 is rotated by use of a suitable wrench tool to vertically position piston 86 within chamber 88. As base portion 92 contacts the seat ring 20 or 22 associated therewith it applies a downward pressure to the upper portion thereof and thereby wedgedly compresses the seat ring between the ball 15 and the corresponding sidewall 57 or 58 in fluid sealing relationship thereto. When the desired compression is reached the locking nut 96 is tightened in place to lock shaft 82 in position relative to bonnet 30. After the valve has been in service for some time it may be necessary to repeat the above described procedure to compensate for excessive seat ring deformation or wear. The seat ring adjustment afforded by adjustment means 80 permits a positive adjustment of the seat rings from outside the valve without release of valve pressure or disassembly of the valve.

Referring to FIG. 4, a first alternative embodiment of the seat ring adjustment means of the present invention is generally indicated at 100. Adjustment means 100 is substantially identical to the hereinabove discussed adjustment means 80 with the addition of remotely located drive means to control the rotation of shaft 82 and piston 86 respectively within opening 84 and chamber 88. Adjustment means 100 includes a shaft extension 102 coupled at its lower end to shaft 82 and at its upper end to the output shaft of a drive means 104. Shaft extension 102 may be either of the rigid or flexible type. Drive means 104 may be a manual handwheel, an electric motor, a hydraulic motor, a pneumatic motor or any other conventional type of drive means known in the art to selectively drive a rotating shaft. The operation of adjustment means 100 is substantially identical to the operation of adjustment means 80 with the remotely positioned drive means 104 supplying the power to rotate shaft 82 instead of the use of a hand operated wrench type tool. The connection between the output shaft of drive means 104 and the shaft extension 102 preferrably incorporates a slip clutch at 106 to stop the rotation of shaft 82 upon the application of a predetermined amount of pressure by the piston 86 to the valve seat ring 20 or 22.

Figure 5:
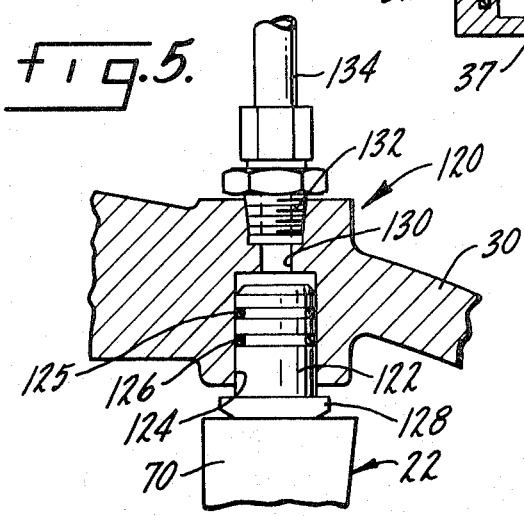
FIG. 5 is an elevational view similar to FIG. 4 incorporating a second alternative embodiment of the valve seat ring adjusting means of the present invention.

Referring to FIG. 5, a second alternative embodiment of the seat ring adjustment means of the present invention is indicated generally at 120. Adjustment means 120 includes a piston 122 positioned within a chamber 124 in bonnet 30 immediately above the corresponding seat ring 20 or 22. O-rings 125 and 126 are embedded within piston 122 to effect a fluid tight seal between piston 122 and chamber 124. Base portion 128 selectively applies pressure to the upper surface of the seat ring 20 or 22. Channel 130 is formed in bonnet 30 in fluid communication with chamber 124. A pressure fitting 132 couples a first end of a conduit 134 to bonnet 30 in fluid communication with channel 130. The other end of conduit 134 is secured to a source of either hydraulic or pneumatic pressure (not shown). The fluid under pressure supplied through conduit 134 enters channel 130 and then chamber 124 to effectively cause piston 122 to apply a downwardly pressure to the upper portion of the seat ring 20 or 22 and thereby wedgedly compress the seat ring between the ball 15 and the corresponding side wall 57 or 58 in a fluid sealing relationship thereto. The pressure of the fluid supplied through conduit 134 may be controlled to retain the desired compression between the seat ring 20 or 22 and the ball 15 to compensate for excessive seat ring deformation or wear.

Various modifications of the disclosed embodiments are contemplated and may obviously be resorted to by those skilled in the art without departing from the spirit and scope of the invention, as hereinafter defined by the appended claims, as only a preferred embodiment thereof has been disclosed.

What is claimed is:

1. A ball valve, including: a body having two longitudinally aligned fluid passages and a lateral opening communicating with a central space; a rotatable ball, positioned within said central space, having an opening therethrough communicable with said fluid passages; a pair of seat rings, of wedge shape cross section, positioned against and clampingly securing said ball therebetween; a pair of seat ring retainer means having flow openings aligned with said fluid passages and side walls inclined downwardly and inwardly towards each other, said ball and said seat rings being wedgably received between said side walls; bonnet means secured to said body in covering relationship to said seat rings and said ball; seat ring adjustment means having a pair of piston means extending through said bonnet means directly above each of said seat rings for selectively applying pressure to a portion of said seat rings and thereby compressing said seat rings to said ball and said ring retainer side walls; each of said piston means includes a piston portion positioned for directly contacting said seat rings and a threaded stem portion having a first end attached to said piston portion and a second end extending outwardly through said bonnet means, said stem portion being threadedly received by said bonnet means so as to permit selective inward and outward movement thereof so as to increase and decrease the pressure applied to said seat rings by said piston portion; said piston portion being received by a cavity formed integral with the inner surface of said bonnet means; and a rotatable valve stem, projecting through said lateral opening and said bonnet means, connected to said ball to rotate said ball between positions permitting and preventing the passage of fluid therethrough.

2. The invention as defined in claim 1 wherein a locking nut is threadedly received on said second end of said stem portion to retain said piston means in a fixed relationship to said seat means.

3. The invention as defined in claim 1 wherein the outer end of said stem portion is secured to a first end of a shaft extension, said shaft extension having a second end secured to a motor means for rotation thereof about an axis passing through said piston means so as to selectively rotate said stem portion relative to said bonnet means.

4. The invention as defined in claim 3 wherein said motor means has slip clutch means associated therewith for preventing the rotation of said shaft extension when the pressure applied to said seat rings reaches a predetermined value.

5. A ball valve, including: a body having two longitudinally aligned fluid passages and a lateral opening communicating with a central space; a rotatable ball, positioned within said central space, having an opening therethrough communicable with said fluid passages; a pair of seat rings, of wedge shape cross section, positioned against and clampingly securing said ball therebetween; a pair of seat ring retainer means having flow openings aligned with said fluid passages and side walls inclined downwardly and inwardly towards each other, said ball and said seat rings being wedgably received between said side walls; bonnet means secured to said body in covering relationship to said seat rings and said ball; seat ring adjustment means having a pair of piston means extending through said bonnet means directly above each of said seat rings for selectively applying pressure to a portion of said seat rings and thereby compressing said seat rings to said ball and said ring retainer side walls; each of said piston means includes a piston portion received within a cavity formed integral with the inner surface of said bonnet means for reciprocal inward and outward movement thereof, said outer end of said piston portion being in fluid communication with a source of pressurized fluid so as to exert force thereon and thereby apply pressure to said seat rings at the inner end of said piston portion; and a rotatable valve stem, projecting through said lateral opening and said bonnet means, connected to said ball to rotate said ball between positions permitting and preventing the passage of fluid therethrough.

* * * * *